Figure 1:
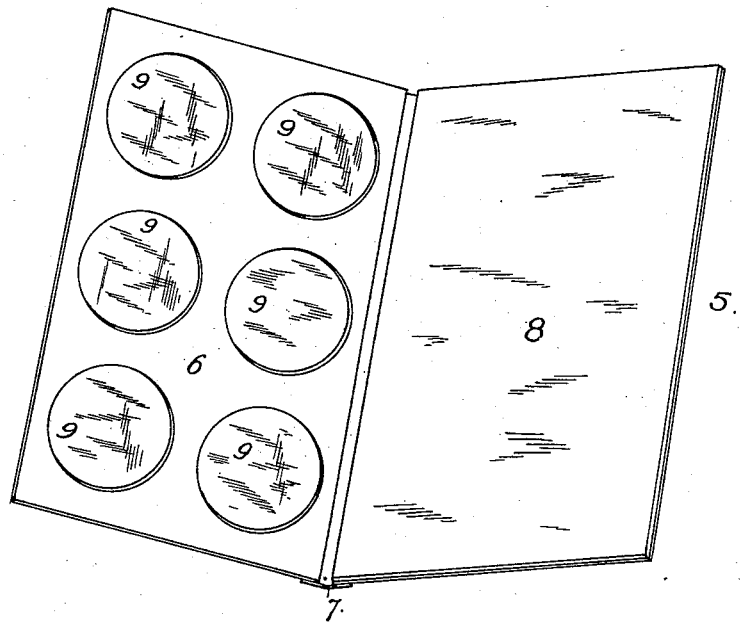

(No Model.)

A. V. SCHONBORN.
MEANS FOR MENDING INNER TUBES OF BICYCLE TIRES.

No. 591,501. Patented Oct. 12, 1897.

Witnesses

Inventor
A. V. Schonborn
By his Attorney

UNITED STATES PATENT OFFICE.

ARTHUR V. SCHONBORN, OF DENVER, COLORADO, ASSIGNOR OF ONE-HALF TO WM. R. WILCOX, OF STEAMBOAT SPRINGS, COLORADO.

MEANS FOR MENDING INNER TUBES OF BICYCLE-TIRES.

SPECIFICATION forming part of Letters Patent No. 591,501, dated October 12, 1897.

Application filed October 8, 1896. Serial No. 608,315. (No model.)

*To all whom it may concern:*

Be it known that I, ARTHUR V. SCHONBORN, a citizen of the United States of America, residing at Denver, in the county of Arapahoe and State of Colorado, have invented certain new and useful Improvements in Means to Facilitate the Mending of Inner Tubes of Bicycle-Tires and other Rubber Goods; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in means for mending the inner tubes of bicycle-tires.

My object is to greatly facilitate the operation of preparing the patches and applying them to the inner tube of the pneumatic tire.

One step in the mending of punctures in the class of tires stated consists in applying cement to the thin rubber patch, which is then allowed to dry partly before applying to the tube. According to the present or ordinary method of mending tires after the cement is applied to the rubber patch or film the latter rolls up into a small scroll or roll. The reason of this is that the rubber expands on the side to which the cement is applied, while the other side remains in its normal state or condition. This patch, having assumed the shape of a small roll, is very difficult to handle. In fact, it is impossible to handle it without touching the cement side or surface with the fingers. Experience proves that if the inner surface of the patch or the surface to be applied to the tube is touched with the fingers it is very difficult to make the patch stick. In other words, it is very essential that the surface to be applied to the tube should not be touched or soiled before applying it to the tube in order to obtain the best results and cause the patch to properly and permanently adhere to the tube. In unrolling the patch it is impossible to prevent the fingers from touching the cement surface thereof. My object is to prevent the rolling of the patch after the cement is applied. I accomplish this by combining the rubber with a backing of cardboard or other suitable or similar material of sufficient stiffness to prevent the rubber from rolling.

The rubber may be applied to the cardboard or other backing in the form of small patches or in sheets of any desired size. After applying the cement the patch is placed on the tube before removing the backing, which may then be easily separated from the patch by peeling it off, since the patch adheres more tightly to the rubber tube than to the backing. In applying the rubber to the backing care may be taken not to stick it more tightly than is necessary to maintain it in place and thus cause the backing to perform its function. Very slight adhesive power will be sufficient to prevent the patch from rolling. When the rubber is applied to the backing in the form of distinct patches, the piece of backing containing the patch may be cut from the sheet, or, if the sheet is small, the patch may be applied to the tube without cutting the corresponding piece of backing from the sheet. When the rubber is applied in sheets to the backing, a piece of any desired size may be cut from the sheet of material composed of the rubber and backing.

The accompanying drawings illustrate the invention in the form of two sheets adapted to fold in such a manner as to be conveniently carried in the pocket. One sheet shows the rubber applied to the card in the form of round patches, while the other sheet shows an integral piece of rubber applied to the entire surface of the sheet. The two sheets are connected by a strip of some suitable flexible material.

Figure 2:
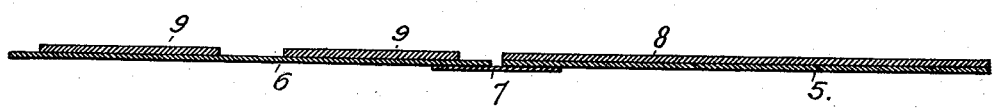

Figure 1 of the drawings is a perspective view of two sheets being open to expose the rubber. Fig. 2 is a section taken on the line *x x*, Fig. 1.

Similar reference-characters indicate corresponding parts in the views.

Let the numerals 5 and 6 designate the respective sheets of cardboard backing, and 7 the flexible connection between the sheets. An integral piece of rubber 8 is applied to the sheet 5, covering its entire inner surface, while to the sheet 6 is applied a number of circular rubber patches 9, sufficient space being left between them to allow the cardboard to be cut without cutting the patches.

It must be understood that I do not limit the use of the invention to the mending of tires, as it may be employed to equal advantage in mending all classes of rubber goods.

In the description I have referred especially to bicycle-tires, as this use perhaps better illustrates the advantages of the invention, since the mending of tires is more nearly universally understood and practiced than the mending of other rubber goods.

Having thus described my invention, what I claim is—

As an improved article of manufacture, the means herein described to facilitate the mending of pneumatic tires and other rubber goods, said means comprising a backing of cardboard or other material of sufficient stiffness for the purpose, and a layer or thickness of the patching material applied to said backing in such a manner that the adhesion between the patch and the backing is less than that between the tire and the patch, whereby the backing may be removed after the patch is applied to the tire.

In testimony whereof I affix my signature in presence of two witnesses.

ARTHUR V. SCHONBORN.

Witnesses:
ALFRED J. O'BRIEN,
W. R. WILCOX.